Dec. 25, 1962 J. H. SEARCY 3,070,663

GATING CIRCUIT FOR LOW-LEVEL MULTIPLEX SYSTEM

Filed Sept. 25, 1961 2 Sheets-Sheet 1

*INVENTOR*

John H. Searcy

*BY* [signature]

*ATTORNEY*

GATING CIRCUIT FOR LOW-LEVEL MULTIPLEX SYSTEM

Filed Sept. 25, 1961

2 Sheets-Sheet 2

INVENTOR

John H. Searcy

BY George W. Robillard

ATTORNEY 3,070,663
Patented Dec. 25, 1962

3,070,663

GATING CIRCUIT FOR LOW-LEVEL MULTIPLEX SYSTEM

John H. Searcy, Fort Lauderdale, Fla., assignor to Systems Engineering Laboratories, Incorporated, Fort Lauderdale, Fla., a corporation of Florida Filed Sept. 25, 1961, Ser. No. 140,469
12 Claims. (Cl. 179—15)

The present invention relates generally to multiplex systems, and more particularly to a time division multiplex system adapted to handle low-level signals.

In the past, attempts to multiplex low-level signals, such as are generated by thermocoupled or other similar transducers have not been completely satisfactory due to loss in intelligence between the input terminals of the channels and the common output of the system. Particular problems which occur are, for example, the D.-C. drift associated with the necessary amplifying elements and the influence of a common voltage upon the differential signal (common mode error). For low signal levels, the drift amplitude introduced is frequently of the same order of magnitude as the information signals. Drift and common mode errors are greatly reduced by the use of transformer coupling. Transformer coupling, however, is objectionable due to microphonics induced by low frequency mechanical disturbances and distortion introduced by saturation resulting from energy storage of a particular polarity. Saturation can also be objectional since channel-to-channel cross talk results, this being another form of signal degradation.

Many of these problems are overcome as, for example, the elimination of D.-C. drift by the use of a prior art circuit of the type appearing on pages 55 and following of the July 1, 1960, issue of Electronics magazine which is entitled "Transistorized Data Amplifier Has High Gain-Stability." In this article there is disclosed (FIGURE 1) a single channel wherein a direct coupled transistor amplifier A with transformer-coupled chopper input B and output C circuits is utilized. The amplifier is of the A.-C. type. This system operates in the same manner as the circuit to be discussed in connection with FIGURES 2 and 3. The circuit also utilizes a single secondary winding C and center-tapped capacitors $C_1$ and $C_2$. On the first half of the cycle, the capacitor $C_1$ is charged to the voltage of the first half of the first wave. On the second half of the cycle $C_2$ is charged to the voltage of the second half of the first wave. Thus, after one complete cycle the output is the top to bottom voltage across the capacitors. The output rises after a single cycle to its full value. In this manner a D.-C. input signal can be converted by a switching mechanism to an alternating signal and thereby eliminate the necessity of a D.-C. amplifier. This directly eliminates the problems of drift which are inherent in the D.-C. amplifier systems.

The prior art has also suggested that the problem of D.-C. drift in a time division multiplex system can be overcome by plus-minus sampling in which the commutator reverses the polarity of the connections on alternate contacts with each individual channel. This is discussed at page 96 of "Radio Telemetry" by Nichols and Rauch, John Wiley and Sons, 1956.

A system of the type disclosed in the above-mentioned articles must inherently operate at a very slow rate of speed with respect to the capabilities of present day electronic circuits.

This speed problem is overcome by the use of a patentably novel gating circuit to sequentially reverse the direction of current flow in the primary winding of the transformer.

In accordance with this invention a first conductor of an input channel is connected to an electron emitting electrode of a first transistor, the electron emitting electrode of the first transistor being coupled to the collecting electrode of a second transistor through a first primary winding of a transformer. The second conductor of the input channel is connected to the electron emitting electrode of the second transistor the electron emitting electrode of the second transistor being connected to the electron connecting electrode of the first transistor through a second primary winding of the transformer which is wound in the direction opposite to the first winding. The two transistors are sequentially energized thereby producing a positive and negative indication of the signals at the input channel in the primary windings of the transformer. This signal will be utilized in the same manner as set forth in the above-identified "Electronics" magazine article. It should be understood that a plurality of such channels sequentially operated will be utilized in order to obtain time division multiplex operation.

A gating circuit of this type has many advantages over other prior art gates for use in a multiplexing system of this type. For example, the same type of transistors (either PNP or NPN) are used in each gating circuit, thereby achieving much better tracking. This will be true since the same manufacturing techniques will be used for both transistors thereby making a match much more likely. Furthermore, the drive signal to the gate is obtained from standard logic levels thus eliminating the necessity of using special levels and pulse generation.

It is an object of this invention to provide a gating system for a time division multiplex system having a faster switching action than the prior art gates of this type.

It is a further object of this invention to provide a gating circuit for a time division multiplex system having a drive signal obtained from standard logic levels.

It is still a further object of this invention to provide a gating circuit for a time division multiplex system using plural transistors of the same type of transistors.

Other objects of this invention will be obvious to those skilled in the art when considered in light of the specification, drawings, and the appended claims.

Figure 2:
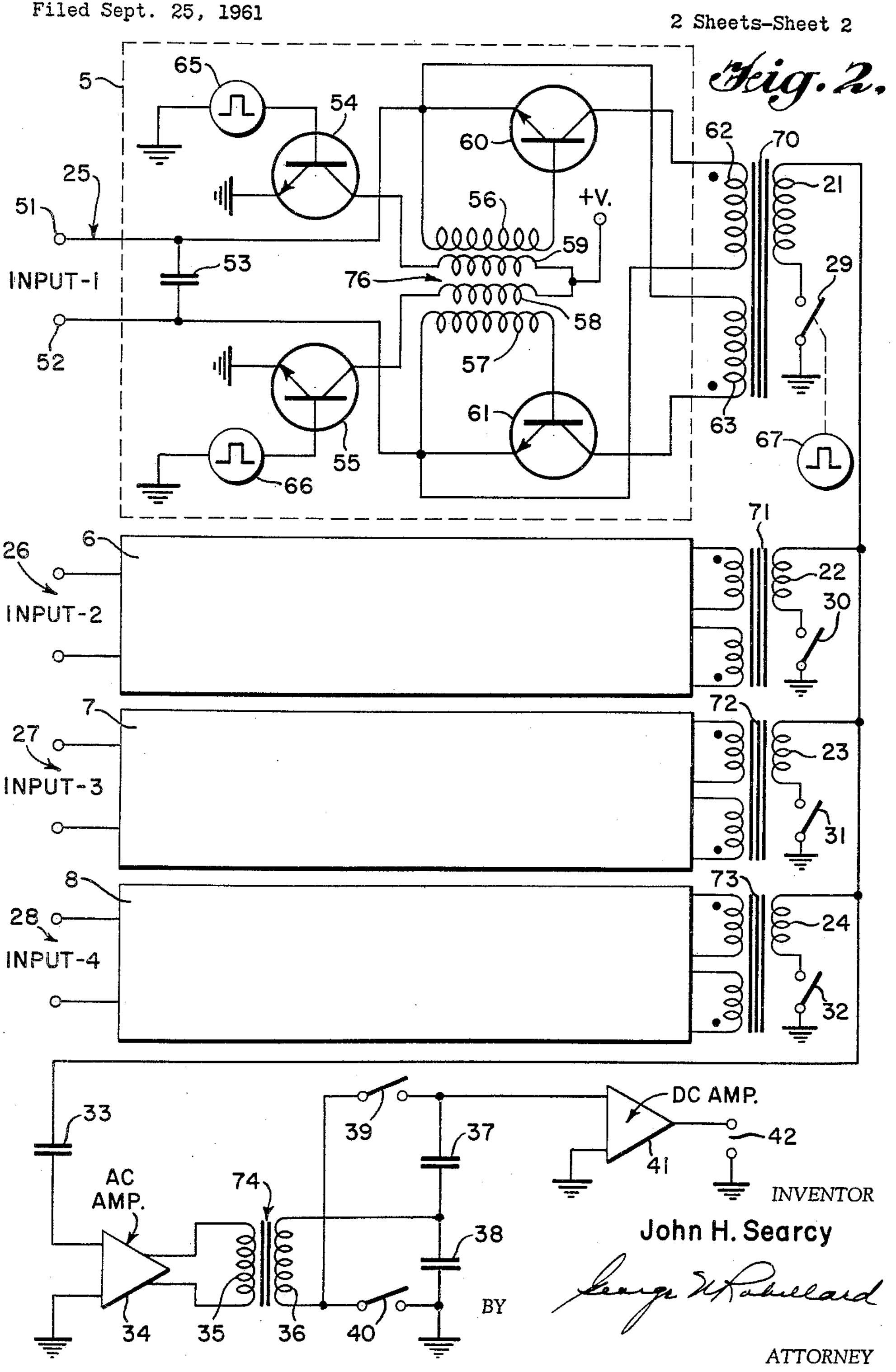
FIGURE 2 is a schematic diagram of the preferred form of the present invention.

In FIGURE 2, the schematic diagram of the preferred embodiment of the invention, the circuit comprises four identical signal channels 25, 26, 27 and 28 each of which is connected to a low-level input signal source designated as inputs 1, 2, 3 and 4, respectively. The input signal sources 1, 2, 3 and 4 may be thermocouples or similar low-level signal producing means. Each channel is connected to a gating circuit 5, 6, 7 and 8. The gating circuit 5 will be described in detail, however, it should be understood that the gating circuits 6, 7 and 8 are identical to 5.

The gating circuit 5 of the channel 25 comprises four n-p-n transistors 54, 55, 60 and 61. The base of the transistor 54 is coupled to ground through a source of periodic signal pulses. The emitter of the transistor 54 is coupled to ground while the collector is coupled to a source of positive voltage V through the primary winding 59 of transformer 76.

The base electrode of the transistor 55 is coupled to ground through a source of periodic signal pulses 66 and the emitter electrode thereof is coupled to ground. The collector electrode is coupled to the source of positive voltage V through the primary winding 58 of the transformer 76. The emitter electrode of the transistor 60 is coupled to the input terminal 51 and also to the base electrode of the transistor 60 through the secondary winding 56 of the transformer 76. The emitter 61 through the primary winding 63 of the transformer 70. The collector electrode of the transistor 60 is coupled to the emitter electrode of the transistor 61 through the primary windings 62 of the transformer 70. The primary windings 62 and 63 are oppositely wound. The emitter electrode of the transistor 61 is coupled to the base electrode of said transistor through the secondary winding 57 of the transformer 76, the emitter electrode also being coupled to the input terminal 52. The input terminals 51 and 52 are coupled by means of a capacitor 53.

The gating circuit 5 operates in the following manner. In a first time period *b* (FIGURE 3), a signal pulse from the source 65 causes the transistor 54 to become conductive and thereby places a potential difference between the emitter electrode and the base electrode of the transistor 60. This will provide a complete signal path from the input 51 through the transistor 60, the primary winding 62 and the input terminal 52.

During a second time interval *c* the source of pulses 65 will be off while the source of pulses 66 will be turned on along with the source 67. Thereby, the transistor 55 will become conductive and cause current to pass through the winding 58 and the transformer 76. The presence of current in the windings 58 will cause current to be impressed upon the winding 57 and make the transistor 61 conductive. Accordingly, a complete signal path can now be traced from the input terminal 51, through the primary winding 63, the transistor 61 and the input terminal 52.

The transformer windings are polarized to cause a flux reversal and an A.-C. voltage to be induced across the winding 21.

Transistors 60 and 61 may be prematched for voltage drop between collector and emitter. The cancellation of this voltage pedestal does not occur directly as in other low-level gates, since only one is conducting at a time. Cancellation occurs when the signal is rectified at the output of the amplifier. Cancellation occurs in time rather than directly, this being a unique feature of this analogue gating circuit.

The gating circuits 6, 7 and 8 of the channels 26, 27 and 28, respectively, operate in the same manner as the gating circuit 5.

The signals in the secondary windings 21 to 24 are coupled to a common A.-C. amplifier 34 through a coupling capacitor 33 by the closure of switches 29, 30, 31 and 32, each of said switches coupling one of the secondary windings to ground upon closure thereof.

The switch 29, which could be, for example, a transistor or a relay could be closed by a pulse from the pulse generator 67. The pulse produced by the pulse generator 67 will extend through the time intervals *b* and *c* and *j* and *k* to close the switch 29 during these time intervals. Similarly, pulse generators (not shown) will close the switches 30, 31 and 32 during the time intervals set forth in FIGURE 3.

The signals from the secondary windings, which are alternating, are transferred through the coupling capacitor 33 to the input terminal of the A.-C. coupled amplifier 34 which amplifies the signals from a low-level to a high-level value. The use of an A.-C. rather than a D.-C. amplifier with a modulated common time division multiplex signal of low-level is entirely advantageous because there is no drift associated therewith.

The output signal from the A.-C. amplifier 34 is applied to the primary winding 35 of the transformer 74. This signal is transferred to the secondary winding 36 of the transformer and is thereby switched alternately across the capacitors 37 and 38 at times to coincide with the switching action of the input transistor switches (such as 60 and 61 respectively). This switching is accomplished by means of the alternate closure of the switches 39 and 40 in synchronism with the switches 60 and 61. These capacitors (37 and 38) function as a holding or storage device for the peak A.-C. signals applied thereto.

Accordingly, switches 39 and 40 and capacitors 37 and 38 serve as a synchronous rectifier for the A.-C. signal applied thereto. The output voltage obtained across capacitors 37 and 38 is applied to a D.-C. amplifier 41, the output of which is a time division multiplex signal of the input signals which have been amplified without distortion, drift or noise. The amplifier 41 is of standard design having high input impedance and low output impedance to enhance matching with a suitable load.

Figure 1:
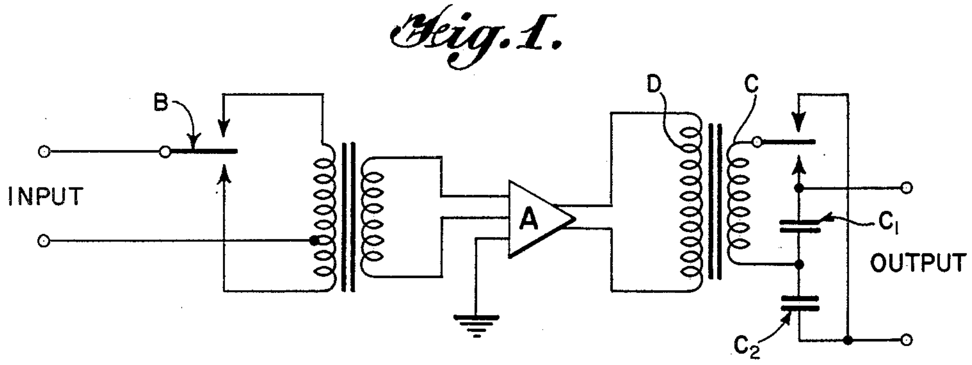
FIGURE 1 is a schematic diagram of the above-mentioned prior art system.
Figure 3:
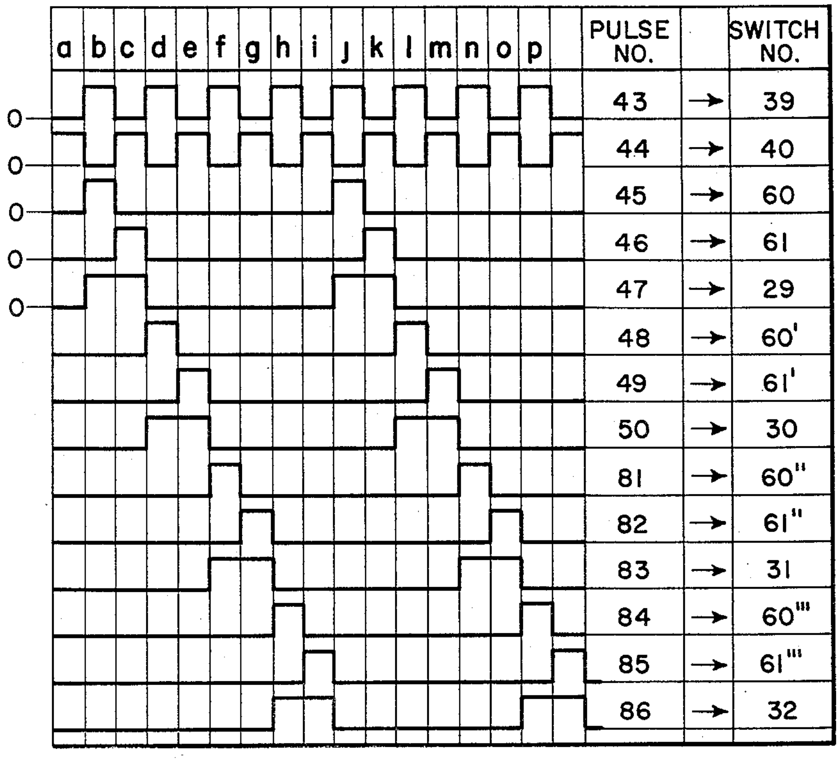
FIGURE 3 is a timing diagram of the preferred form of the invention of FIGURE 2.

The operation of the system disclosed in FIGURE 2 is best understood by reference to the timing diagram illustrated in FIGURE 3.

FIGURE 3 discloses a timing diagram which includes a plurality of rectangular signal pulses 43 through 50, and 81 through 86. A positive going signal pulse during one of these time periods will signify the closure of the switches indicated. The switches could be, for example, transistors which are rendered conducting by a positive pulse at times indicated in FIGURE 3 to act as "open" or "closed" switches.

Reference to FIGURE 2 discloses that in the time period *b* the signal 43 is positive, thereby closing switch 39. Also, the signals 45 and 47 are positive, thereby closing the switches 60 and 29. During this time period input signal pulses will travel from the terminal 51 through the switch 60 and the primary windings 62 and back to the second terminal 52 of the input 1. A signal pulse will thereby be placed on the secondary winding 21 of the transformer 70 since the secondary windings have been connected to ground through the switch 29. This signal travels through the coupling capacitor 33 to the A.-C. amplifier 34 wherein it is amplified and transferred to the primary winding 35 of the transformer 74. This signal will be passed to the secondary winding 36 and charge the capacitor 37, the switch 39 having been closed.

During the time interval *c* the switches 40, 61 and 29 will be closed, the remaining switches being held open. Accordingly, an input signal will travel from the terminal 51 to the primary winding 63 and then through the switch 61 and back to the second terminal 52 of the input 1. This signal will be of opposite polarity to the signal at the input of the transformer 70 during the time period *b* due to the fact that the primary windings are oppositely poled. The signal is transferred to the secondary winding 21, one terminal of which has been coupled to the ground through the switch 29, the signal passing through the coupling capacitor 33 to the A.-C. amplifier 34 and thence to the primary winding 35 of the transformer 74. The signal is then transferred to each of the secondary winding 36 and charges the capacitor 38 through the closed switch 40. It should be noted that in time period *c* the voltage across the secondary winding 36 will be of opposite polarity to the voltage during time interval *b*. Therefore, the capacitor 38 will be charged in a direction opposite to that of capacitor 37. Accordingly, the voltage across the sum of the two capacitors will be the difference of the two input voltage signals in the time intervals *b* and *c*. This difference voltage is then transferred through the D.-C. amplifier 41 to the output terminals 42.

In a similar manner the channels 26, 27 and 28 will be operated sequentially with the channel 25 by the sequential opening and closing of the transistor switches 60', 61' and the switches 30, 39 and 40 for channel 26; the transistor switches 60'', 61'' and the switches 31, 39 and 40 for channel 27; and the transistor switches 60'', 61'' and the switches 32, 39 and 40 for channel 28 by the appropriate signal pulse as set forth in FIGURE 3.

It should be noted that each of the switches set forth could preferably be a transistor which is rendered conductive by a pulse on the control electrode thereof at the proper time. Therefore, the pulses 43 to 50 and 81 to 86 in FIGURE 3 would be clock pulses produced in the time relation set forth to operate the respective transistor switch.

It should be understood that the switching rate of the switches at the input terminals will be somewhat greater than the frequency of the changes in voltage level at the input terminals in order that the magnitude of the positive and negative waves will be substantially the same.

Though the invention has been described with respect to a specific embodiment, many variations will be obvious to those skilled in the art. Accordingly, it is the intention to be limited only as indicated by the scope of the following claims which are to be interpreted as broadly as possible in view of the prior art.

What is claimed is:

1. A time division multiplex system for low-level input signals comprising a plurality of signal channels, each channel having a first and a second signal input conductor, a first and a second transistor, each having an electron emitting electrode, an electron collecting electrode and a control electrode, said first signal input conductor being coupled to the electron emitting electrode of said first transistor and said second signal input conductor being coupled to the electron emitting electrode of said second transistor, a transformer having a first and a second primary winding and a secondary winding, said primary windings being oppositely wound, said first signal input conductor being coupled to one terminal of one of said primary windings and said second input conductor being coupled to one terminal of the other of said primary windings, the other terminal of said one primary winding being coupled to the electron collecting electrode of said second transistor, the other terminal of said other primary winding being coupled to the electron collecting electrode of said first transistor, and means coupled between the control electrode and the electron emitting electrode of each of said transistors for periodically placing a potential of predetermined value between the control electrode and the electron emitting electrode of one of said transistors.

2. A device as set forth in claim 1 wherein said means includes a switch causing a potential difference to be sequentially applied between said first and third electrodes of each of said transistors.

3. A device as set forth in claim 2 wherein said switch includes a transistor having a control electrode and means coupled to the control electrode of said transistor for sequentially rendering said transistor conductive.

4. A device as set forth in claim 1 wherein said switch means includes a third and a fourth transistor, each having a control electrode, means coupled to each of said control electrodes to sequentially render each of said transistors conductive, said third transistor being in circuit with the first and third electrodes of said first transistor and said fourth transistor being in circuit with the first and third electrode of said second transistor.

5. A time division multiplex system for low-level input signals comprising a plurality of signal channels, each channel having a first and a second signal input conductor, a first and a second transistor, each having a first, second and third electrode, said first signal input conductor being coupled to one of said electrodes of said first transistor and said second signal input conductor being coupled to one of said electrodes of said second transistor, a transformer having a first and a second primary winding and a secondary winding, said primary windings being oppositely wound, said first signal input conductor being coupled to one terminal of one of said primary windings and said second input conductor being coupled to one terminal of the other of said primary winding, the other terminal of said one primary winding being coupled to a second one of said electrodes of said second transistor, the other terminal of said other primary winding being coupled to a second one of said electrodes of said first transistor, and means coupled between the third ones of said electrodes and the first ones of said electrode of each of said transistors for sequentially placing a potential of predetermined value between the first and third electrodes of each of said transistors.

6. A device as set forth in claim 5 wherein said means includes a switch causing a potential difference to be sequentially applied between said first and third electrodes of each of said transistors.

7. A device as set forth in claim 6 wherein said switch includes a transistor having a control electrode and means coupled to the control electrode of said transistor for sequentially rendering said transistor conductive.

8. A device as set forth in claim 5 wherein said switch means includes a third and a fourth transistor, each having a control electrode, means coupled to each of said control electrodes to sequentially render each of said transistors conductive, said third transistor being in circuit with the first and third electrodes of said first transistor and said fourth transistor being in circuit with the first and third electrode of said second transistor.

9. A time division multiplex system for low-level input signals comprising a plurality of signal channels, each channel having a first and a second signal input conductor, a first and a second transistor, each having a first, second and third electrode, said first signal input conductor being coupled to one of said electrodes of said first transistor and said second signal input conductor being coupled to one of said electrodes of said second transistor, a transformer having a primary winding, a secondary winding, said first signal input conductor being coupled to one terminal of a first portion of said primary winding, and said second input conductor being coupled to a second terminal of another portion of said primary winding, the other terminal of said first portion of said primary winding being coupled to a second one of said electrodes of said second transistor, the other terminal of said second portion of said primary winding being coupled to a second one of said electrodes of said first transistor, and means coupled between the third ones of said electrodes and the first ones of said electrode of each of said transistors for sequentially placing a potential of predetermined value between the first and third electrodes of each of said transistors.

10. A device as set forth in claim 9 wherein said means includes a switch causing a potential difference to be sequentially applied between said first and third electrodes of each of said transistors.

11. A device as set forth in claim 10 wherein said switch includes a transistor having a control electrode and means coupled to the control electrode of said transistor for sequentially rendering said transistor conductive.

12. A device as set forth in claim 9 wherein said switch means includes a third and a fourth transistor, each having a control electrode, means coupled to each of said control electrodes to sequentially render each of said transistors conductive, said third transistor being in circuit with the first and third electrodes of said first transistor and said fourth transistor being in circuit with the first and third electrode of said second transistor.

No references cited.